Oct. 6, 1953 — A. P. DOBROWSKI — 2,654,206

MANUAL CONTROL DEVICE FOR COMBINE TABLE ELEVATORS

Filed April 9, 1952 — 2 Sheets-Sheet 1

Inventor
Allie P. Dobrowski
By J. Irving Silverman
Attorney

Oct. 6, 1953  A. P. DOBROWSKI  2,654,206
MANUAL CONTROL DEVICE FOR COMBINE TABLE ELEVATORS
Filed April 9, 1952  2 Sheets—Sheet 2
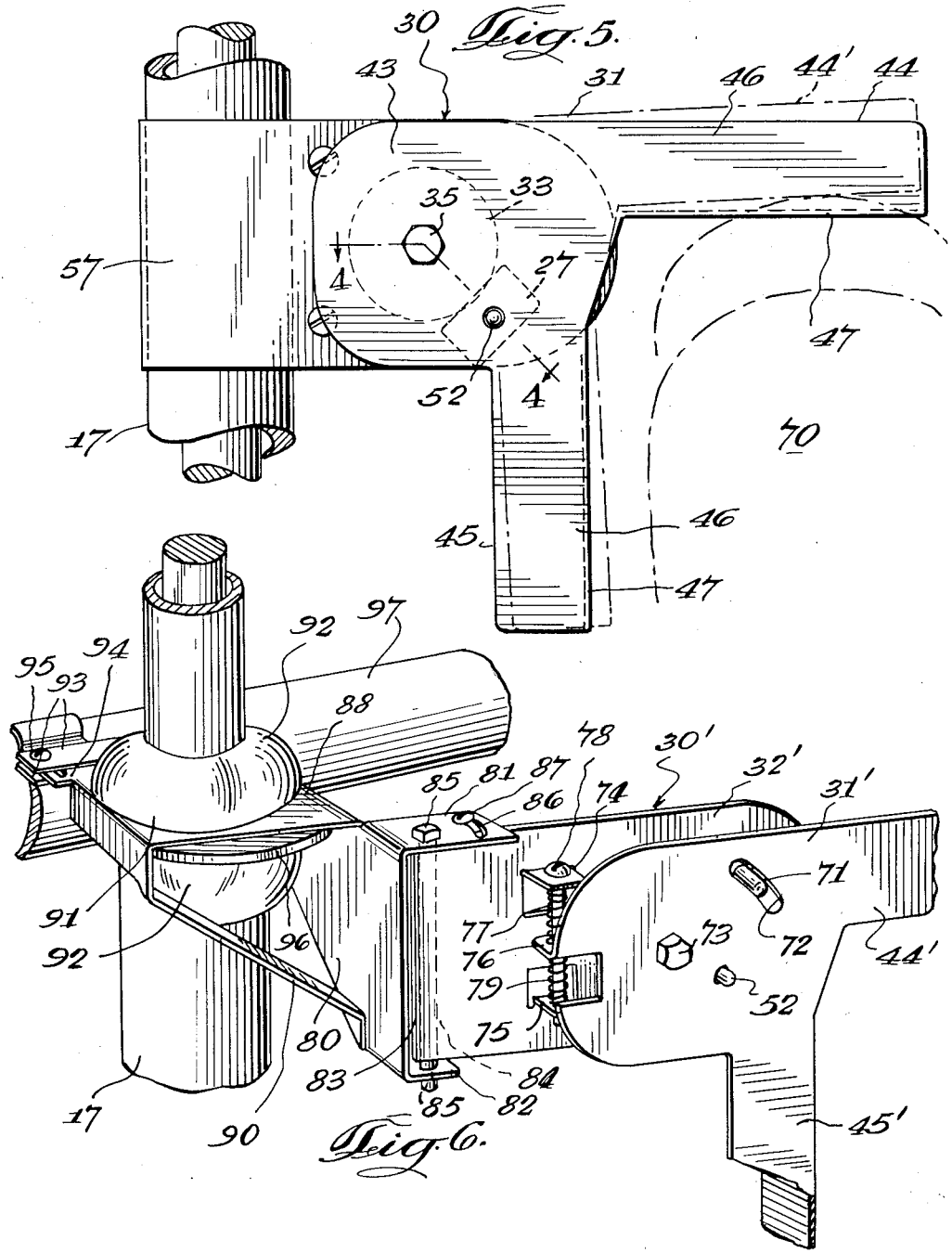
Inventor
Allie P. Dobrowski
By J. Irving Silverman
Attorney Patented Oct. 6, 1953

2,654,206

UNITED STATES PATENT OFFICE 2,654,206

MANUAL CONTROL DEVICE FOR COMBINE TABLE ELEVATORS

Allie Phillip Dobrowski, Chicago, Ill.

Application April 9, 1952, Serial No. 281,433

16 Claims. (Cl. 56—208)

1

This invention relates generally to combine table elevators and more particularly is concerned with a novel and improved manual control device for such elevators for adjusting the height of the cutting bar of the table above the terrain to suit the particular crop being harvested and to permit instantaneous changes in such height as may be required due to varying nature of the terrain and the varying height of the crop.

The herein invention is especially adapted for use with the modern conventional type of combine which uitilizes electrical means for raising and lowering the cutting bar. Such combines are useful for speedy harvesting and flexibility in operation without the necessity of making mechanical changes requiring stopping of the combine. The combine is intended to be moved forward at a rather rapid rate, the grain being laid upon the table by the reel and being cut by the cutter bar at the leading edge of the table. Thereafter the grain is threshed and separated from the straw.

As the combine moves, the operator has various duties to perform. Principal of these is the steering of the vehicle and the adjustments to the height of the grain. Steering is a two-handed task and to a great extent the problem of raising or lowering the table has been alleviated in the type of combine with which I am concerned. Thus there is a simple toggle switch, having three positions, representing "up," "down" and "neutral." In the first two of these positions, electric motors move the entire table and its hood up or down, and in the neutral position the motor or motors are rendered inoperative. The operator may intend to take only the heads of the grain into the combine, and hence besides steering the vehicle as it moves across the field he must watch terrain variations and variations in the height of the stand of grain. He is required to constantly manipulate the switch to raise and lower the table elevator. Of course this may require great skill and may even become dangerous if the operator has one hand off the wheel at a crucial moment.

While this has been an improvement over other combines which have utilized manual control devices, it still does not provide the immediate response and control of the table elevator which is vary desirable, because the attention of the operator is diverted when he must reach for the switch, and he must remove one hand from the steering mechanism in order to accomplish this. Many other disadvantages derive from the necessity of the operator manipulating the switch by hand.

It is the primary object of the invention to alleviate all of the difficulties and disadvantages of the use of the electrical switch for raising and lowering the table elevator of the combine by a

2 simple and easily constructed device to be associated with the switch, or have the switch associated therewith.

Still a further object of the invention is to provide a switch for operating the combine table elevator which does not require the operator to remove his hands from the steering mechanism at any time that the combine is being operated.

Another important object of the invention is to provide a control device of the character described which is adapted to be associated with the switch for operating the table elevator mechanism which is operated by the knee of the operator, and whereby the operator need pay no attention to the control device but can concentrate on steering the vehicle, and in which he can cause the table elevator to raise or lower instantaneously by a slight movement of his knee.

A further object of the invention lies in the provision of a novel control device in which the switch being operated by the said control device is biased to return to neutral position whenever the operator releases the device.

A still further object of the invention lies in the provision of a control device of the character described which is easily adaptable to practically any type of combine which utilizes an electrical switch operated table elevator mechanism, and especially to provide such a control device which is simple to construct and easy to install and operate.

With the foregoing and other objects in view which will appear as the description proceeds, the invention consists of certain novel features of construction, arrangement and a combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of this invention, there is illustrated in the accompanying drawings a preferred embodiment thereof, from an inspection of which, when considered in connection with the following description, this invention, its mode of construction, assembly and operation, and many of its advantages should be readily understood and appreciated.

Referring to the drawings in which the same characters of reference are employed to indicate corresponding or similar parts throughout the several figures of the drawings:

Fig. 5 is a side elevational view of the control device showing the manner in which same may be operated by the knee of the driver.

Fig. 6 is a perspective view of a modified form of the manual control device embodying the invention.

Figure 1:
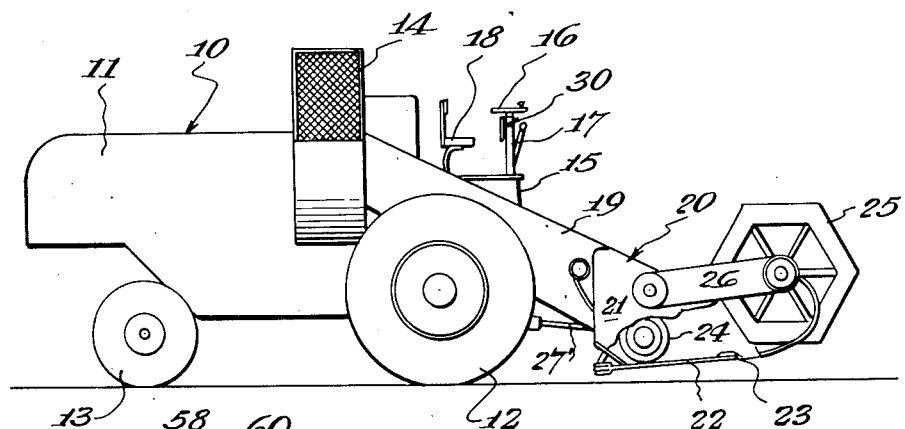
Fig. 1 is a general side elevational view of a combine having my manual control device associated therewith.

The combine upon which my manual control device is adapted for operation is of the self-propelling type designated generally in Fig. 1 by the reference character 10. Same icludes a body portion 11 supported upon a pair of front driving wheels 12 and a pair of rear driving wheels 13. The body 11 contains the threshing equipment and power plant (not shown) and supports the grain receiving tank 14 along one side thereof. At the forward end of combine is provided a driver's platform 15 and a steering wheel 16 mounted on the upper end of the steering column 17 is positioned in front of the driver's seat 18 supported on the platform.

Also mounted on the forward end of the combine is an elongate chute 19 extending downwardly and forwardly, one end of said chute being connected to said body portion 11 and the other end supporting thereon the table elevator designated generally 20 and opening thereunto. The chute 19 houses a vertical feeder mechanism (not shown) which feeds an uninterrupted flow of cut grain to the threshing equipment. The table elevator consists of a hood 21, a grain table 22 which closes off the bottom thereof, a cutter bar 23 mounted on the leading edge of the table and a feathering auger 24 journalled at each end thereof in a side wall of a hood. To the upper end of the hood 21 is connected a pick-up reel 25 by means of the supporting bars 26, the reel extending forwardly of the table mechanism 20.

The elevator 20 may be driven from the power plant of the combine by means of electric motors (not shown), operating a drive shaft 27' or the like shown in Fig. 1 and the raising and lowering of the elevator is effected through the toggle switch 27 which energizes the motor circuits (not shown) operating the lifting or lowering mechanism (not shown). The elevator 20 is raised and lowered as a unit as the combine is driven over the terrain. In operation, the combine is driven over the terrain to be harvested with the pick-up reel laying the grain down on the table 22 to be cut by the cutting bar 23. After the grain is cut, it is engaged by the feathering auger 24 which feeds the grain toward the center of the hood 21 and back to the opening in the chute 19 communicating with the hood where it is picked up by the vertical feeder mechanism and carried up the chute 19 to the threshing equipment in the body 11.

The construction above described is conventional and does not constitute the invention hereof except in the combination thereof with the novel and unique manual control device for the switch for raising and lowering the table elevator mechanism 20. Although, one particular form of combine has been described, it is not intended that the manual control of the invention be limited to this particular combine, since same is capable of being associated with a variety of combines having electrically controlled table elevator mechanisms without departing from or exceeding the bounds of the invention.

The manual control device embodying the invention is designated generally by the reference character 30. Same is formed of a pair of plate members 31 and 32 adapted to be assembled and mounted as a unit on the steering column 17. Each plate 31 and 32 is provided with certain constructional features which permit the objectives of the invention to be accomplished when same are assembled.

The inner surfaces of the plate members 31 and 32 are arranged opposite one another and are pivotally mounted one relative to the other by means of a pair of bearing members 33 and 34, one being provided on each of the plates. The bearing members have flat engaging surfaces adapted to ride one against the other and the entire assembly is held together by suitable fastening means such as bolt 35 and nuts 36. The one bearing member 34 is formed as a housing or projection which is welded or otherwise secured to the inner surface of plate 32 having recesses 37 and 38 formed therein. These recesses are aligned with projections 39 and 40 which are formed in the opposite bearing surface of member 23. Obviously the projections 39 and 40 limit the rotative motion of the two bearing members and also serve another purpose to be described.

Figure 3:
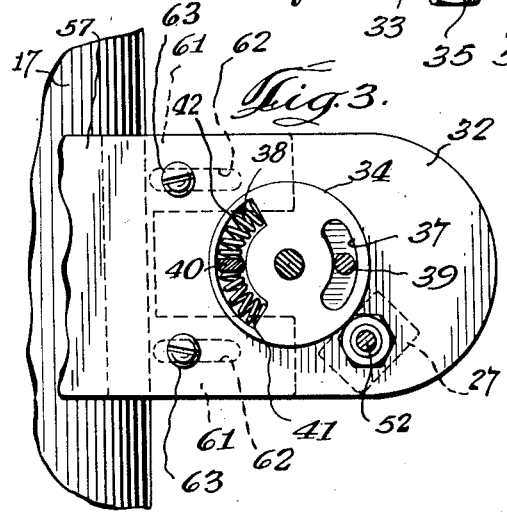
Fig. 3 is a sectional view taken through the control device showing the construction of the spring actuated return mechanism, taken along the line 3—3 of Fig. 2 and in the direction indicated.
Figure 4:
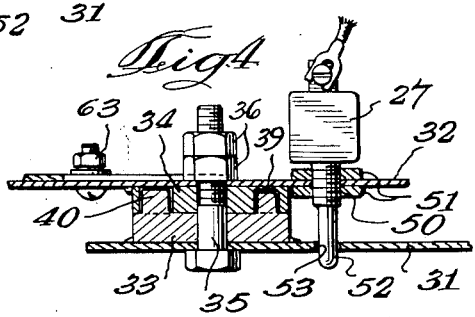
Fig. 4 is a sectional view taken through the said control device along the line 4—4 of Fig. 5 and in the indicated direction.

The recess 37 is arcuate in shape and receives the projection 39 therein. Movement of the projection 39 will be limited by the ends of the recess 37 so that pivotal movement of the plates 31 and 32 thereby will be limited. The recess 38 also is arcuately formed and is adapted to receive therein a pair of helical springs 41 and 42 with the projection 40 disposed between them. Thus, when the plates 31 and 32 are pivoted the projection 40 will bear against one or the other of the springs 41, 42 and when released, the springs 41, 42 automatically will cause return of the projection 40 to its mid-position as shown in Fig. 3. In this manner, the control device always is biased to return to neutral position with the switch open whenever the driver releases the device.

Considering the construction of plate 31, same includes a body portion 43 upon which the bearing member 33 is mounted and a pair of arms 44, 45 integrally formed on said portion 43 and extending therefrom in a direction forming a right angle therebetween. Each said arm has an elongate flat wall 46 which lies in the same plane as the portion 43 and an elongate flange 47 extending perpendicularly thereto and coextensive therewith. Said flanges 47 provide knee-engaging portions by means of which the control may be operated by the pressure of the driver's knee exerted thereagainst.

Figure 2:
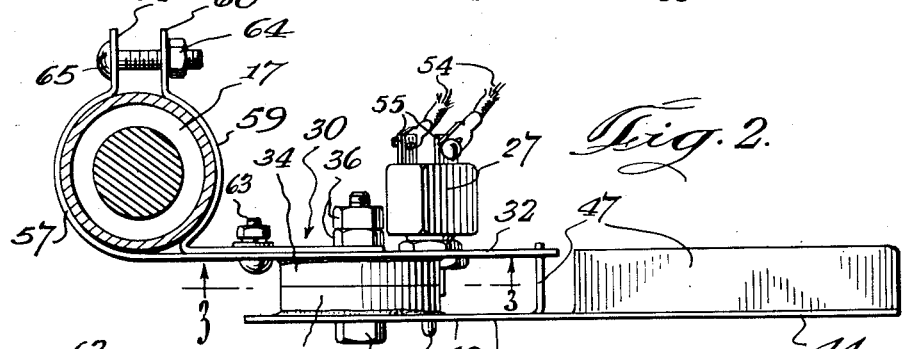
Fig. 2 is an enlarged top plan view of the manual control device showing the manner in which the same is installed upon a combine.

The plate member 32 also has a flat, body portion which mounts the bearing member 34. To the outer surface of member 32 is secured the toggle switch 27, said switch having a threaded shaft 50 which is inserted through a suitable opening in the plate 32 and fastened thereon by means of the nuts 51. Extending from the shaft is the switch arm 52 which is adapted to be inserted through an aligned opening 53 formed in the portion 43 of plate 31. In Fig. 2, the leads 54 connected to the posts 55 of the switch operatively connect said switch to the circuit (not shown) of the combine which operates the motors for raising and lowering the table elevator mechanism 20. Thus, when the plates 31 and 32 are pivoted, the body portion 43 will engage the arm 52 and move same in the direction of movement of the plate 31 whereupon the switch will be thrown selectively for raising and lowering the table level mechanism.

It should be appreciated that the provision of the bearing members 33 and 34 in the form and assembly described also permits the stop means and spring return means to be encased therein as in a housing. In this manner, the structure is compact, prevents dirt and grit from clogging the operating parts and generally protects same.

The plate 32 is formed at one end thereof with a clamping jaw comprising a curved leg 57 having the ear 58 on the end thereof. Secured to the plate 32 is the opposite jaw comprising a second leg 59 curved opposite to leg 57 and having an ear 60 formed on the end thereof. The leg 59 may be permanently secured to the plate 32 as by welding or the like. However, as shown in Fig. 3 said leg 59 may be provided with a pair of parallel extensions 61 each having a slot 62 therein. Suitable fastening devices 63 may be received through the plate 32, slots 62 and extensions 61 for adjustable mounting of the leg on the plate 32.

The curved legs 57 and 59 form thereby a clamping device or bracket means of which the control 30 may be mounted on the steering column 17 and secured thereon by tightening the nut 64 on the bolt 65 received in the ears 58 and 60 in a well known manner. The distance of the arms 44 and 45 from the steering column 17 may be adjusted by means of the fastening devices 63 movable in the slots 62.

Referring to Fig. 5, the control 30 is shown mounted on the steering column 17. In this position the arms 44 and 45 will be arranged with the flanges 47 thereof in position adjacent the knee 70 of the operator of the combine. For purposes of description, let us presume that the operator wishes to raise the table. The operator raises his knee 70 against the flange 47 of arm 44 and raises the arm 44 to the position shown in broken lines at 44'. The plate member 31 will be pivoted upwardly as shown in Fig. 5 moving the switch arm 52 therewith thereby closing the switch 27 and energizing the circuit of the motor for raising the table elevator. The operator keeps his knee 70 against the flange 47 of arm 44 at all times that he wishes the elevator raised and when it is raised the distance he desires, he releases the arm 44. The pivoting of the plate 31 in an upward direction also will have caused projection 40 to bear against spring 41 compressing same and upon release of arm 44, the spring 41 will return the projection 40 and plate 31 to its normal neutral position. The return movement will also result in the switch arm 52 being returned whereby to open the switch 27 and stop movement of the table elevator. Of course, projection 39 riding in the recess 37 acts as a stop member limiting movement of the arm 44 and protecting the mechanism of switch 27 from injury.

For lowering the table elevator, the operator merely presses his knee 70 against the flange 47 of arm 45, moving arm 45 to the left, as viewed in Fig. 5. The plate 31 will be pivoted thereby moving switch arm 52 in a direction closing the switch 27 energizing the mechanism for lowering said table elevator. Upon release of the arm 45, the spring 42 will cause return of the switch arm 52 to open the switch 27 and stopping the elevator at any desired position.

It will be appreciated that the direction of movement of the arms 44 and 45 for raising and lowering the table elevator has been designated merely by way of example, and obviously could be adapted for convenience of the particular driver. The flat surface of each flange 47 permits comfortable and easy manipulation of the control device 30 by the knee 70 and obviously, means have been described for adjusting the position of the arms 44, 45 relative to the knee 70 to suit the driver.

Referring to Fig. 6, I have shown a modified form of the invention which I have designated 30'. Same includes a pair of pivotal plates 31' and 32' which are pivotally assembled on the shaft 73. A pair of arms 44' and 45' are formed on the plate 31' which likewise are adapted to be actuated by the knee of the driver. The plate 32' has a lug or projection 71 formed on the inner surface thereof which is adapted to be received in the arcuate slot 72 formed in plate 31' and thereby form the stop means limiting pivotal movement of the said plates one relative to the other about the bolt 73 inserted through both plates. The switch arm 52 of the switch 27 is shown engaged in a suitable opening in plate 31' and will be moved with the movement of the plate 31'.

In this modified form of the invention, the means for returning the plates to neutral position are provided on the plates 31' and 32'. Said means include an ear 74 stamped from the said plate, and a second ear 75 also stamped from plate 32' and spaced therefrom. The plate 31' also has an ear 76 stamped therefrom which when the plates are assembled is disposed midway between the ears 74 and 75. Between the ears 74 and 76 is mounted a coil spring 77 by means of the bolt 78 and between ear 76 and ear 75 is mounted a second spring 79 held in position by the same bolt which extends through the ears. When the plate 31' is pivoted upward, the spring 79 will be compressed so that upon release of plate 31', said spring 79 will cause the plates to return to initial starting position or neutral position with respect to the switch 27 and the switch will be opened.

The bracket for mounting the control device 30' on the steering column 17 is associated with the plate 32'. Same is formed with a vertically arranged wall 80 having a flange 81 at the top edge thereof and a flange 82 at the bottom edge, the flanges being adapted to receive therebetween the plate 32'. The end 83 of plate 32' is curled to receive the shaft 84 and the ends of the said shaft are journalled each in one of the flanges 81, 82 and held fast by means of nuts 85. In this manner, the plate 32' may be pivoted about the shaft 84. The flange 81 is provided with an arcuate slot 86 in which is secured a screw 87 which limits the pivotal movement of the plate 32'.

Extending opposite from the flanges 81, 82 is a large flange 88 formed at the top of the wall 89. The flange 88 is braced by means of the strut 90 connecting between flange 88 and wall 89. The strut 90 may be integrally formed with the flanges 88 or formed as an individual member suitably secured to brace the flange 88. The flange 88 has a circular opening 91 therein adapted to receive the column 17 so that the control 30' may be mounted on said column. I have shown in Fig. 6 the control device 30' mounted on the column 17 between a pair of collars 92, 92 on said column which are removable. The control is held fast by means of the pair of clamping bars 93, 93 secured over the ears 94, 94 formed on the flange 88, there being suitable fastening devices such as bolt 95 and a nut (not shown) inserted through the bars 93, 93 and ears 94, 94 in a well known manner. The flange 88 in addition is supported on the bar 96 which connects between the column 17 and railing 97 which extends around the driver's platform 15.

It is believed that this invention, its mode of operation, construction and assembly, and many of its advantages should readily be understood from the foregoing without further description, and it should be manifest that while a preferred embodiment of the invention has been shown and described for illustrative purposes, the structural details are nevertheless capable of wide variation within the purview of the invention as defined in the appended claims.

What is claimed and desired to be secured by Letters Patent of the United States is:

1. An electrical switch control device for the cutter bar of a combine having a steering mechanism and apparatus for raising and lowering the cutter bar including an electrical switch for starting and stopping said apparatus, said device comprising a pair of co-axially assembled plate members pivotal one relative to the other, one plate having a bracket for securing the assembled plates adjacent the steering mechanism with the second plate operatively associated with the switch for opening and closing the same, knee operable means on the said second plate adapted to be manipulated manually for pivoting the second plate relative to the other plate selectively to close the switch to said apparatus for raising or lowering said cutter bar, said plates having means normally biasing the plates to remain in a neutral position with said switch open and cooperating stop means limiting pivotal movement of said second plate.

2. An electrical switch control device for the cutter bar of a combine having a steering mechanism and apparatus for raising and lowering the cutter bar including an electrical switch for starting and stopping said apparatus, said device comprising a pair of co-axially assembled plate members pivotal one relative to the other, one plate having a bracket for securing the assembled plates adjacent the steering mechanism with the second plate operatively associated with the switch for opening and closing the same, knee operable means on the said second plate adapted to be manipulated manually for pivoting the second plate relative to the other plate selectively to close the switch to said apparatus for raising or lowering said cutter bar, said plates having means normally biasing the plates to remain in a neutral position with said switch open and cooperating stop means limiting pivotal movement of said second plate, said knee operable means comprising a pair of arms angularly disposed in a plane parallel to the plane of said second plate, each arm being arranged to be engaged by the knee of the driver of the combine to be moved for pivoting said second plate relative to the other plate for selectively operating said switch.

3. An electrical switch control device for the cutter bar of a combine having a steering mechanism and apparatus for raising and lowering the cutter bar including an electrical switch for starting and stopping said apparatus, said device comprising a pair of co-axially assembled plate members pivotal one relative to the other, one plate having a bracket for securing the assembled plates adjacent the steering mechanism with the second plate operatively associated with the switch for opening and closing the same, knee operable means on the said second plate adapted to be manipulated manually for pivoting the second plate relative to the other plate selectively to close the switch to said apparatus for raising or lowering said cutter bar, said plates having means normally biasing the plates to remain in a neutral position with said switch open, each plate member having a bearing member engaged one against the other with said axis extending through the bearing members, and cooperating stop means limiting pivotal movement of said second plate formed in said bearing members.

4. An electrical switch control device for the cutter bar of a combine having a steering mechanism and apparatus for raising and lowering the cutter bar including an electrical switch for starting and stopping said apparatus, said device comprising a pair of co-axially assembled plate members pivotal one relative to the other, one plate having a bracket for securing the assembled plates adjacent the steering mechanism with the second plate operatively associated with the switch for opening and closing the same, knee operable means on the said second plate adapted to be manipulated manually for pivoting the second plate relative to the other plate selectively to close the switch to said apparatus for raising or lowering said cutter bar, said plates having means normally biasing the plates to remain in a neutral position with said switch open, each plate member having a bearing member engaged one against the other with said axis extending through the bearing members, and cooperating stop means limiting pivotal movement of said second plate formed in said bearing members comprising a projection formed on one bearing member, the other bearing member having a slot therein, for receiving therein said projection when the bearing members are so engaged.

5. An electrical switch control device for the cutter bar of a combine having a steering mechanism and apparatus for raising and lowering the cutter bar including an electrical switch for starting and stopping said apparatus, said device comprising a pair of co-axially assembled plate members pivotal one relative to the other, one plate having a bracket for securing the assembled plates adjacent the steering mechanism with the second plate operatively associated with the switch for opening and closing the same, knee operable means on the said second plate adapted to be manipulated manually for pivoting the second plate relative to the other plate selectively to close the switch to said apparatus for raising or lowering said cutter bar, said plates having means normaly biasing the plates to remain in a neutral position with said switch open and cooperating stop means limiting pivotal movement of said second plate, each plate member having a bearing member engaged one against the other with said axis extending through the bearing members, said plate biasing means being formed in said bearing members.

6. An electrical switch control device for the cutter bar of a combine having a steering mechanism and apparatus for raising and lowering the cutter bar including an electrical switch for starting and stopping said apparatus, said device comprising a pair of co-axially assembled plate members pivotal one relative to the other, one plate having a bracket for securing the assembled plates adjacent the steering mechanism with the second plate operatively associated with the switch for opening and closing the same, knee operable means on the said second plate adapted to be manipulated manually for pivoting the second plate relative to the other plate selectively to close the switch to said apparatus for raising or lowering said cutter bar, said plates having means normally biasing the plates to remain in a neutral position with said switch open and cooperating stop means limiting pivotal movement of said second plate, each plate member having a bearing member engaged one against the other with said axis extending through the bearing members, said plate biasing means being formed in said bearing members and comprising a projection formed on one of said bearing members, said other bearing member having a recess formed therein, a pair of spring members in said recess, said projection being received in said recess between said springs with the springs normally biasing said projection to remain in a position midway between the ends of the recess.

7. An electrical switch control device for the cutter bar of a combine having a steering mechanism and apparatus for raising and lowering the cutter bar including an electrical switch for starting and stopping said apparatus, said device comprising a pair of co-axially assembled plate members pivotal one relative to the other, one plate having a bracket for securing the assembled plates adjacent the steering mechanism with the second plate operatively associated with the switch for opening and closing the same, knee operable means on the said second plate adapted to be manipulated manually for pivoting the second plate relative to the other plate selectively to close the switch to said apparatus for raising or lowering said cutter bar, said plates having means normally biasing the plates to remain in a neutral position with said switch open and cooperating stop means limiting pivotal movement of said second plate, said knee operable means comprising a pair of arms angularly disposed in a plane parallel to the plane of said second plate, each arm being arranged to be engaged by the knee of the driver of the combine to be moved for pivoting said second plate relative to the other plate for selectively operating said switch, said plate biasing means comprising a projection formed on one plate and a pair of spring members supported on the other plate with said projection secured between said springs, said springs normally biasing said projection to a position midway between the springs for keeping the switch open.

8. An electrical switch control device for the cutter bar of a combine having a steering mechanism including a column supporting a steering wheel thereon and apparatus for raising and lowering said cutter bar including an electrical switch for operating said apparatus, said device comprising a pair of co-axially mounted plate members assembled in pivotal relationship one relative to the other, one plate having a bracket for securing the device on the steering column with the second plate operatively engaged with said switch for opening and closing the same, said plates having means for biasing said plates normally to remain in a neutral position with said switch open, said second plate having a pair of arms disposed in the plane of the said plate arranged to be engaged by the knee of the driver of the combine for pivoting the second plate relative to the other plate whereby selectively to close said switch to raise or lower said cutter bar, said plates having a cooperating stop means for limiting relative pivotal movement of the plates.

9. An electrical switch control device for the cutter bar of a combine having a steering mechanism including a column supporting a steering wheel thereon and apparatus for raising and lowering said cutter bar including an electrical switch for operating said apparatus, said device comprising a pair of coaxially mounted plate members assembled in pivotal relationship one relative to the other, one plate having a bracket for securing the device on the steering column, with the second plate operatively engaged with said switch for opening and closing the same, said plates having means for biasing said plates normally to remain in a neutral position with said switch open, said second plate having a pair of arms disposed in the plane of the said plate arranged to be engaged by the knee of the driver of the combine for pivoting the second plate relative to the other plate whereby selectively to close said switch to raise or lower said cutter bar, said plates having cooperating stop means for limiting relative pivotal movement of the plates, each plate having a bearing member engaged one against the other with said axis extending through both bearing members, said bearing members having the stop means and plate biasing means associated therewith.

10. A device as described in claim 9 in which said stop means comprises a lug and slot connection between said bearing members.

11. A device as described in claim 10 in which said plate biasing means comprises a projection formed on one bearing member and said other member having an arcuate slot therein, with said projection received in said slot, a pair of springs in said slot each disposed on opposite sides of the projection and normally biasing the same to a position midway between the ends of the slot to keep the switch open.

12. A device as described in claim 8 in which said stop means comprises a projection formed on one plate and the other plate having a slot receiving therein said projection.

13. A device as described in claim 12 in which said plate biasing means comprises a projection formed on one plate and a pair of springs supported on the other plate having the projection secured therebetween, said springs normally biasing said projection to a position midway between the same to keep the switch open.

14. A device as described in claim 3 in which said bearing members form a protective housing for said stop means.

15. A device as described in claim 9 in which said bearing members form a protective housing for both said stop means and plate biasing means.

16. A device as described in claim 5 in which said bearing members form a protective housing for said plate biasing means.

ALLIE PHILLIP DOBROWSKI.

References Cited in the file of this patent

UNITED STATES PATENTS

| Number | Name | Date |
|---|---|---|
| 2,239,155 | Levich | Apr. 22, 1941 |
| 2,420,219 | Baldwin | May 6, 1947 |